United States Patent
Yip

(10) Patent No.: US 8,844,429 B2
(45) Date of Patent: Sep. 30, 2014

(54) BEVERAGE MAKER WITH PUMP NOISE ATTENUATOR

(75) Inventor: Thomas Chung Lik Yip, Hong Kong (CN)

(73) Assignee: G.E.W. International Corporation Limited, Kwun Tong (HK)

( * ) Notice: Subject to any disclaimer, the term of this patent is extended or adjusted under 35 U.S.C. 154(b) by 568 days.

(21) Appl. No.: 13/078,133

(22) Filed: Apr. 1, 2011

(65) Prior Publication Data

US 2012/0247341 A1 Oct. 4, 2012

(51) Int. Cl.
*A47J 31/46* (2006.01)

(52) U.S. Cl.
CPC ........................................ *A47J 31/46* (2013.01)
USPC .............................. 99/300; 417/312; 416/140

(58) Field of Classification Search
CPC ......................................................... A47J 31/46
USPC .............................. 99/300; 417/312; 416/140
See application file for complete search history.

(56) References Cited

U.S. PATENT DOCUMENTS

| 4,784,378 A | * | 11/1988 | Ford ............................... 267/219 |
| 5,489,193 A | * | 2/1996 | Levallard ....................... 416/140 |
| 7,578,419 B2 | * | 8/2009 | Greenwald et al. ............ 222/333 |
| 2009/0151573 A1 | * | 6/2009 | Tonelli et al. .................... 99/280 |

FOREIGN PATENT DOCUMENTS

JP        09268989 A   * 10/1997 ............. F04C 25/02

* cited by examiner

*Primary Examiner* — Jianying Atkisson
(74) *Attorney, Agent, or Firm* — Leydig, Voit & Mayer, Ltd.

(57) ABSTRACT

A beverage maker, such as a pump espresso machine, comprises a noise attenuator reducing pump noise. The noise attenuator has a housing with an inlet chamber receiving inlet flow from an inlet port, the inlet chamber having compliant walls permitting volumetric expansion. An outlet chamber in the noise attenuator housing has an outlet port and spheroidal walls. A flow-restrictor is disposed between the inlet and outlet chambers. An elastomeric insert in the housing forms the inlet chamber and at least part of the outlet chamber.

16 Claims, 3 Drawing Sheets

BEVERAGE MAKER WITH PUMP NOISE ATTENUATOR

TECHNICAL FIELD

The present invention relates to beverage makers having pumps, and to noise attenuators for such beverage makers.

BACKGROUND OF THE INVENTION

Beverage makers, such as espresso machines, employ an electrically powered positive displacement pump for the delivery of water at relatively high pressure, for instance to a brewing chamber or for impelling flow through a boiler or heat exchanger. The pump casing has a bore in which a piston reciprocates, its stroke determining a working chamber, and typically with spring-loaded inlet and discharge valves. The piston may be driven at high frequency, as by magnetic induction. Due to its geometry, port timing, and speed, such pumps produce a flow ripple that excites pressure waves in the water. The uneven delivery of water flow is an inherent characteristic of such a pump that contributes primarily to the flow ripple. The pump excites water borne noise which is transmitted to valves, lines, boiler or heat exchanger and then to the structures to which those components are mounted. The structures then emit vibrations that create the greater part of the overall air borne noise emitted by the beverage maker. Therefore, there is need to reduce the water borne noise, as it is key to the reduction in the noise generated by the beverage maker. It is an object of the present invention to address this need or more generally to provide an improved beverage maker.

DISCLOSURE OF THE INVENTION

According to one aspect of the present invention there is provided a beverage maker comprising:

a pump;

a noise attenuator housing with an inlet port in communication with the pump, and an outlet port;

an inlet chamber in the noise attenuator housing, the inlet chamber receiving flow from the inlet port, the inlet chamber having compliant walls permitting volumetric expansion of the inlet chamber;

Figure 2:
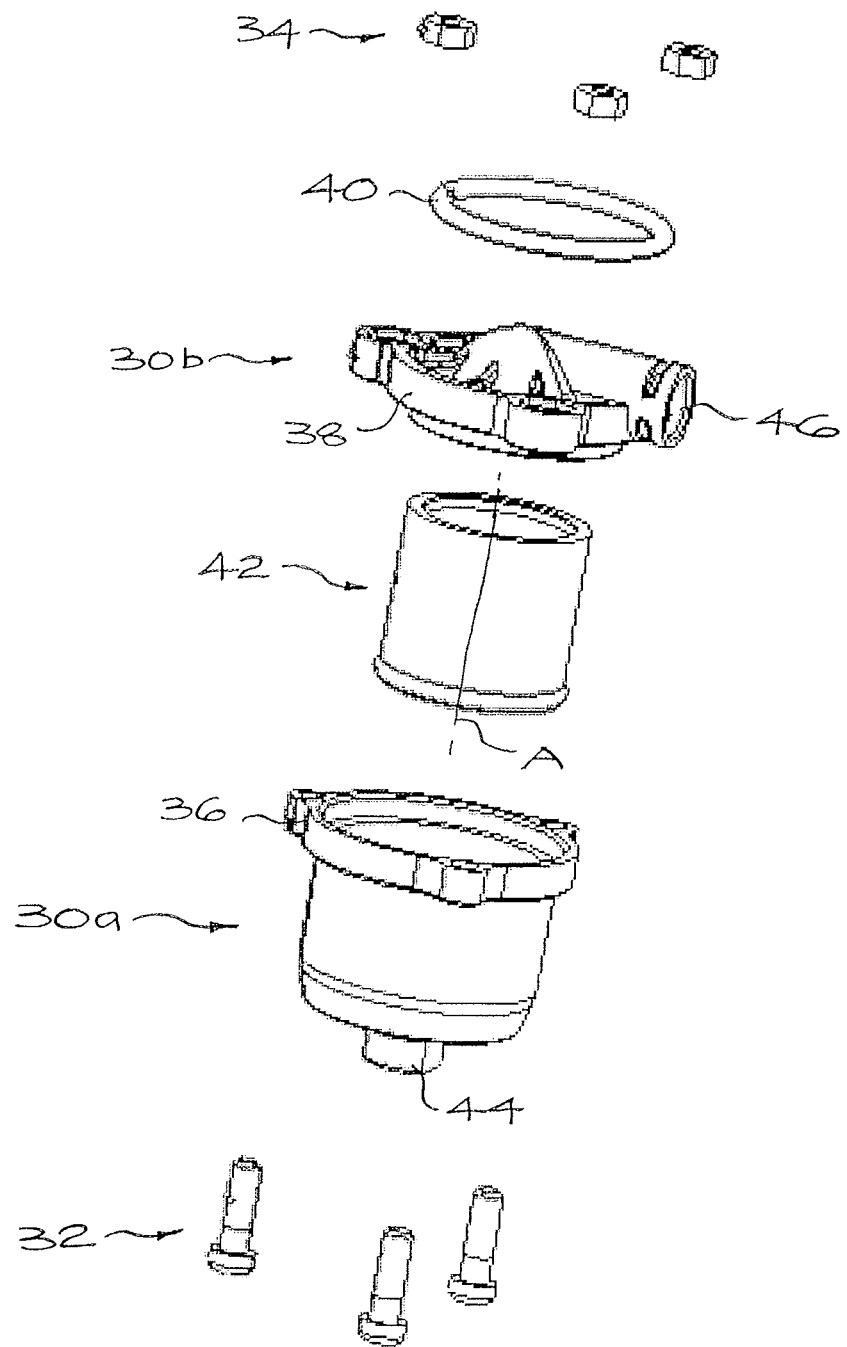
Figure 3:
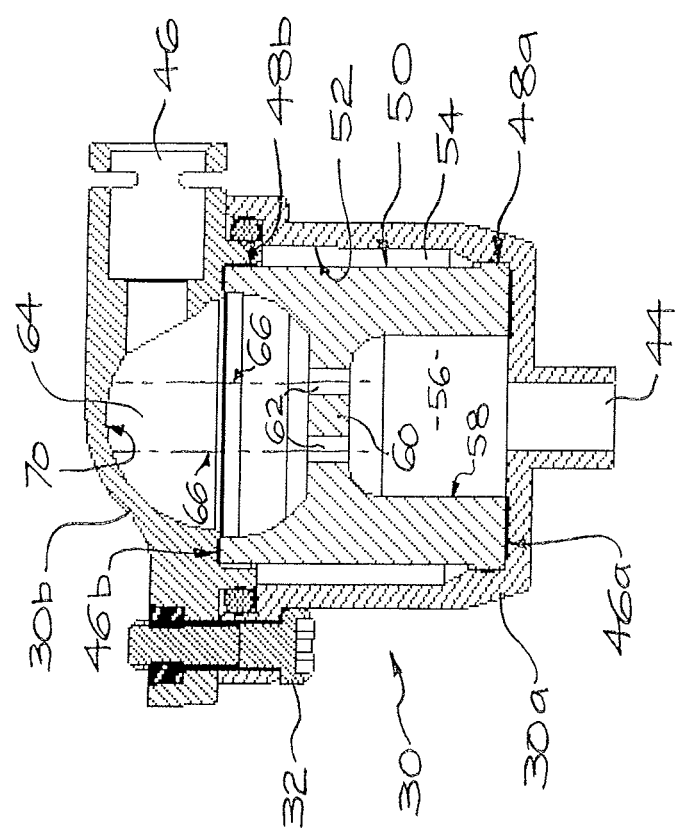

an outlet chamber in the noise attenuator housing, the outlet chamber having spheroidal walls, wherein flow from the outlet chamber passes to the outlet port, and a flow-restrictor disposed between the inlet and outlet chambers such that flow conducted from the inlet chamber to the outlet chamber is restricted by the flow-restrictor.

The beverage maker may be an espresso machine, a tea or coffee maker, a machine for frothing milk, or the like. Although the noise attenuator housing is preferably separate from the pump or pump housing, it may be formed as a part of the pump or pump housing. The pump is preferably a positive-displacement pump.

Preferably a trapped volume of compressible material is provided in the inlet chamber which serves as a cushion volume. The water acts on the trapped volume of compressible material to absorb any pressure increases attributed to the flow ripple and subsequently expel such pressure increases as the system pressure attributed to the flow ripple decreases. Preferably the compliant walls of the inlet chamber are provided by an insert of resilient material, a cavity in the insert defining the inlet chamber, and wherein a void extends about the insert, between an outer surface of the insert and an inner surface of the housing to provide for expansion of the inlet chamber.

Preferably the flow-restrictor comprises at least one passage extending through the insert. To provide the flow restriction the cross-sectional area of the flow-restrictor is less than the cross-sectional area of the inlet port. The flow-restrictor is preferably a fixed flow restrictor as the differential pressure across the flow restrictor and system operating pressure are generally constant, however an adjustable flow-restrictor with an adjustable orifice that is selectably variable to control the size thereof could be used in the alternative to accommodate machines requiring pressure differentials and operating pressures.

Preferably at least part of the spheroidal walls of outlet chamber are formed by a concavity in the insert. Preferably at least part of the spheroidal walls of outlet chamber are formed by a recess in the housing.

Preferably the at least one passage extending through the insert comprises a plurality of passages extending through the insert.

Preferably an axis of each of the at least one passages extending through the insert is aligned with a concave face of the recess in the housing.

Preferably the insert has axially opposing ends, each end having a transverse face abutting the housing, and adjacent each annular transverse face a circumferential face abutting the housing. The transverse faces and circumferential faces are preferably annular, and serve to prevent axial movement of the insert, radial movement of the insert at the ends, and to seal the inlet and outlet chambers from the void.

Preferably the insert is formed from an elastomer, most preferably silicone.

Substantially reduced noise is produces by a beverage maker having a noise attenuator according to the invention. It is believed that there are two mechanisms that work to reduce such a ripple. The first is damping, whereby the resilient walls of the first chamber work as a damper to reduce the excitation of the ripple all frequencies. The second mechanism is pressure wave interference and cancellation. Besides being effective and efficient in operational use, by its modular and compact construction it can be readily used in a range of products The device may be economically constructed and has an overall simple design which minimizes manufacturing costs.

In another aspect the invention provides a noise attenuator for a fluid system comprising:

a housing with an inlet port in communication with the pump, and an outlet port;

an inlet chamber in the housing, the inlet chamber receiving flow from the inlet port, the inlet chamber having compliant walls permitting volumetric expansion of the inlet chamber;

an outlet chamber in the housing, the outlet chamber having spheroidal walls, wherein flow from the outlet chamber passes to the outlet port, and a flow-restrictor disposed between the inlet and outlet chambers such that flow conducted from the inlet chamber to the outlet chamber is restricted by the flow-restrictor

BRIEF DESCRIPTION OF THE DRAWINGS

Preferred forms of the present invention will now be described by way of example with reference to the accompanying drawings, wherein:

FIG. 1 is an exploded pictorial view of a beverage maker according to the invention;

FIG. 2 is an exploded view of the noise attenuator of the beverage maker of FIG. 1, and FIG. 3 is a sectional view through the inlet and outlet ports of the noise attenuator of FIG. 2.

DESCRIPTION OF THE PREFERRED EMBODIMENTS

Figure 1:
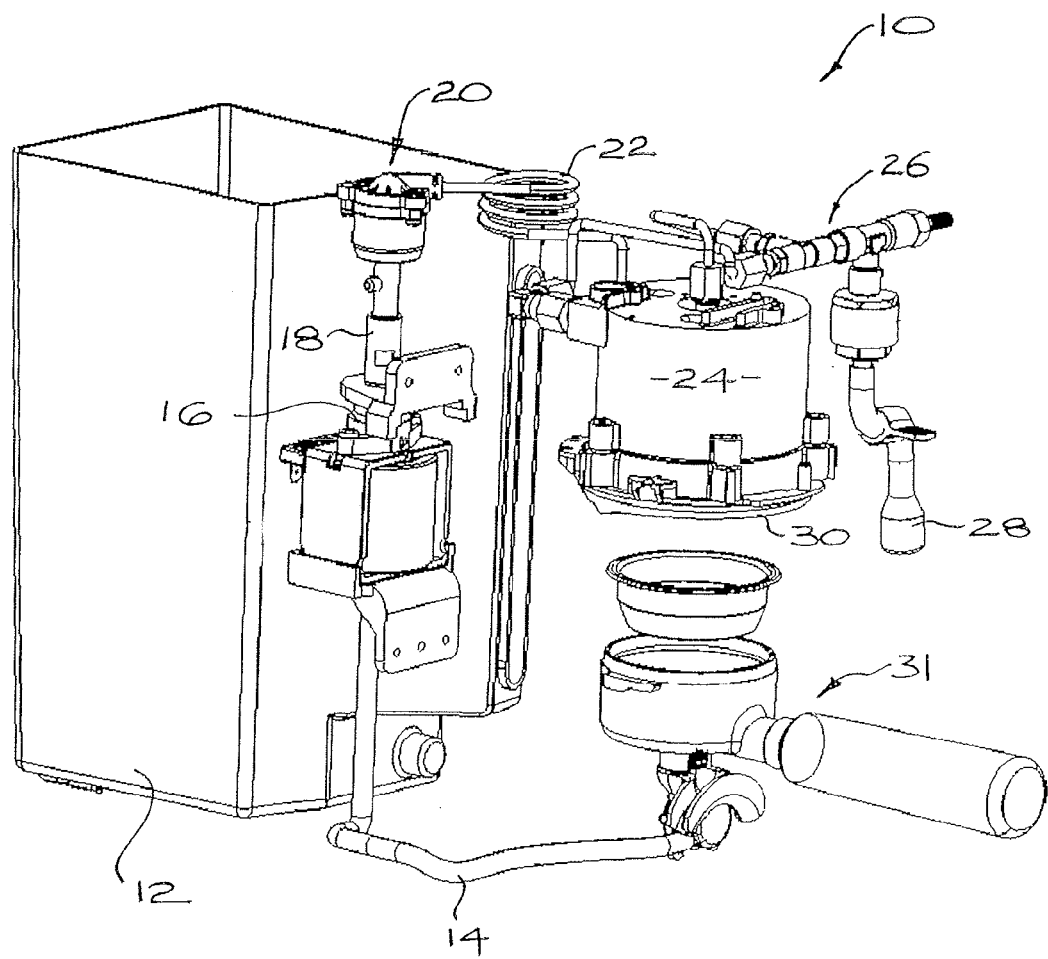

Referring to FIG. 1, a beverage maker 10, such as a electrically-pumped espresso maker, comprises a water tank 12 from which water is drawn through a suction pipe 14 by a pump 16, such as a reciprocating piston pump driven by magnetic induction. The pump delivers water through conduit 18 to the noise attenuator 20, from which it then passes via conduit 22 to a thermoblock 24 (comprising a combined boiler and heat exchanger). A solenoid-operated three-way valve 26 determines whether the pressurised output is directed through the boiler for discharge through the nozzle 28, or through the heat exchanger for discharge through an outlet 30 below which the porta-filter 31 may be fixed. The drawing is merely illustrative of one type of beverage maker to which the invention is applicable.

The general construction of the noise attenuator 20 is best seen in FIG. 2. A principal component of the noise attenuator 20 is its housing 30, which as shown may be assembled from first and second shells 30a, 30b coupled together by screw fasteners 32 and nuts 34. The shells 30a, 30b may be of substantially rigid moulded polymeric construction. Flanges 36, 38 are provided with apertures for receiving the screw fasteners 32 and an O-ring 40 seals the shells 30a, 30b together in a fluid-tight manner. Disposed internally in the housing 30 is an elastomeric insert 42, most preferably made from a silicone elastomer.

An inlet port 44 in the noise attenuator housing 30 is in communication with the pump 16, and an outlet port 46 is connected to the conduit 22.

The insert 42 has axially opposing ends, each end having a transverse face 46a, 46b of annular form which abuts a complementary face of the housing 30. Adjacent, and generally perpendicular to each of the transverse faces 46a, 46b is a respective circumferential face 48a, 48b also abutting a complementary face the housing. The transverse faces 46a, 46b and circumferential faces 48a, 48b serve to prevent axial movement of the insert 42, and radial movement at the ends of the insert 42.

The insert 42 has a substantially cylindrical external surface 50, coaxial with a substantially cylindrical internal surface 52 on the housing 30, defining a void 54 between the insert 42 and the housing 30. The engagement between the housing 30 and the transverse faces 46a, 46b and circumferential faces 48a, 48b also seals the void 54 against water ingress.

A cavity in the insert 42 proximate the inlet port 44 and the walls of the housing adjacent the inlet port 44 together define an inlet chamber 56, having walls 58 of a diameter substantially larger than that of the inlet port 44. The resilience of the walls 58 and the void backing them permit volumetric expansion of the inlet chamber 56.

A flow-restrictor formed on a web 60 extending internally in the insert 42, comprises four passages 62 extending through the insert. The web 60 is planar, arranged transverse to the long axis A of the insert 42, and is relatively thinner than the walls 58. The cross-sectional area of the four passages 62 is less than the cross-sectional area of the inlet port 44 to provide the flow restriction. The flow-restrictor formed on a web 60 separates the inlet chamber 56 from an outlet chamber 64, such that flow conducted from the inlet chamber 56 to the outlet chamber 64 is restricted by passing through the passages 64.

The outlet chamber 64 has spheroidal walls, and flow from the outlet chamber 64 passes out of the noise attenuator 20 via the outlet port 46. By appropriate selection of the size of the spheroidal outlet chamber the device and be tuned to the frequency, or frequencies excited by the pump 16. In the illustrated embodiment the longitudinal axis A of the insert extends centrally through both chambers 56, 64. Axes of the inlet and outlet ports 4, 46 may be generally orthogonal to provide a compact noise attenuator, readily able to be plumbed into different beverage makers. Generally half of the spheroidal walls of outlet chamber 64 are formed by a concavity in the insert 42, and half by formed by a recess in the housing 30, the joining plane between the shells 30a, 30b bisecting the outlet chamber 64 at its widest section. The axes 66 of the passages 62 through the flow restrictor are aligned with a concave face 70 of the second chamber 64, specifically on the shell 30b.

Aspects of the present invention have been described by way of example only and it should be appreciated that modifications and additions may be made thereto without departing from the scope thereof.

The invention claimed is:

1. A beverage maker comprising:
   a pump;
   a noise attenuator housing with
      an inlet port, in communication with the pump, for receiving a liquid pumped by the pump, and
      an outlet port for discharging the liquid that flows into the inlet port;
   an inlet chamber located in the noise attenuator housing, wherein
      the inlet chamber receives the liquid received at the inlet port, and
      the inlet chamber has compliant walls that deflect and increase volume of the inlet chamber in response to increases in pressure in the inlet chamber;
   an outlet chamber located in the noise attenuator housing, wherein
      the outlet chamber has spheroidal walls, and
      the liquid flowing from the inlet chamber into the outlet chamber flows to the outlet port;
   a flow-restrictor disposed between the inlet and outlet chambers and restricting flow of the liquid from the inlet chamber to the outlet chamber; and
   a resilient insert located in the noise attenuator housing and defining parts of the inlet chamber and the outlet chamber, wherein
      the compliant walls of the inlet chamber are part of the resilient insert,
      the resilient insert includes a cavity defining the inlet chamber, and
      an outer surface of the resilient insert is spaced from an inner surface of the noise attenuator housing, defining a void between the outer surface of the resilient insert and the inner surface of the noise attenuator housing that permits deflection of the compliant walls of the inlet chamber to increase the volume of the inlet chamber.

2. The beverage maker of claim 1, wherein the flow-restrictor comprises at least one passage extending through the resilient insert.

3. The beverage maker of claim 2, wherein the resilient insert comprises a cavity forming part of the spheroidal walls of the outlet chamber.

4. The beverage maker of claim 2, wherein the flow restrictor comprises a plurality of passages extending through the resilient insert.

5. The beverage maker of claim 3, wherein
the noise attenuator housing includes an internal recess that forms part of the spheroidal walls of the outlet chamber, and
an axis of each of the passages extending through the resilient insert intersect a concave face of the internal recess in the noise attenuator housing.

6. The beverage maker of claim 2, wherein
the resilient insert has a pair of ends that are opposite each other along an axis of the resilient insert, and
each of the ends has a transverse face abutting the noise attenuator housing, and a circumferential face abutting the noise attenuator housing and adjacent the transverse face.

7. The beverage maker of claim 6, wherein
the transverse faces and circumferential faces of each end are annular,
the transverse faces and the circumferential faces prevent axial movement of the resilient insert and radial movement of the resilient insert at the ends, relative to the noise attenuator housing, and
the transverse faces and the circumferential faces seal the inlet and outlet chambers from the void between the outer surface of the resilient insert and the inner surface of the noise attenuator housing.

8. The beverage maker of claim 2, wherein the resilient insert is an elastomer.

9. The beverage maker of claim 8, wherein the elastomer is a silicone elastomer.

10. A beverage maker comprising:
a positive-displacement pump;
a noise attenuator housing with
an inlet port, in communication with the positive-displacement pump, for receiving a liquid pumped by the positive-displacement pump, and
an outlet port for discharging the liquid that flows into the inlet port;
an elastomeric insert located in the noise attenuator housing and having a cavity and a concavity;
an inlet chamber in the noise attenuator housing defined partially by the cavity in the elastomeric insert, wherein the inlet chamber receives the liquid received at the inlet port,
the elastomeric insert, at the cavity, has compliant walls that deflect and increase volume of the inlet chamber in response to increases in pressure in the inlet chamber, and
the elastomeric insert includes an outer surface that is spaced from an inner surface of the noise attenuator housing, defining a void between the outer surface of the resilient insert and the inner surface of the noise attenuator housing that permits deflection of the compliant walls of the inlet chamber to increase the volume of the inlet chamber;
an outlet chamber located in the noise attenuator housing, wherein
the outlet chamber has spheroidal walls defined partially by the concavity in the elastomeric insert and partially by an internal recess with a concave face in the noise attenuator housing, and
the liquid flowing from the inlet chamber into the outlet chamber flows to the outlet port; and
at least one passage extending through the elastomeric insert as a flow restrictor, restricting flow of the liquid from the inlet chamber to the outlet chamber, wherein an axis of each of the passages extending through the elastomeric insert intersects the concave face of the internal recess in the noise attenuator housing.

11. The beverage maker of claim 10, wherein
the elastomeric insert has a pair of ends that are opposite each other along an axis of the resilient insert, and
each of the ends has a transverse face abutting the noise attenuator housing, and a circumferential face abutting the noise attenuator housing and adjacent the transverse face.

12. The beverage maker of claim 11, wherein
the transverse faces and the circumferential faces of each end are annular,
the transverse faces and the circumferential faces prevent axial movement of the elastomeric insert and radial movement of the elastomeric insert at the ends, relative to the noise attenuator housing, and
the transverse faces and the circumferential faces seal the inlet and outlet chambers from the void between the outer surface of the elastomeric insert and the inner surface of the noise attenuator housing.

13. The beverage maker of claim 2, wherein
the resilient insert is one-piece, generally cylindrical in shape, and has a central axis and first and second opposed ends generally transverse to the central axis,
the cavity is located adjacent the first end,
the insert includes a concavity adjacent the second end,
the insert includes a web generally transverse to the central axis, dividing the cavity from the concavity, and
the web includes at least one passage extending through the web, connecting the cavity to the concavity, as the flow-restrictor.

14. The beverage maker of claim 10, wherein
the elastomeric insert is one-piece, generally cylindrical in shape, and has a central axis and first and second opposed ends generally transverse to the central axis,
the cavity is located adjacent the first end,
the concavity is located adjacent the second end, and
the insert includes a web generally transverse to the central axis, dividing the cavity from the concavity, and the web includes the at least one passage.

15. A beverage maker comprising:
a pump; and
a noise attenuator comprising:
an inlet port and an outlet port in fluid communication with each other, wherein the pump is connected to the input port for pumping a liquid into the noise attenuator,
a one-piece elastomeric insert located in the housing and having a generally cylindrical in shape with an outer surface, a central axis, first and second opposed ends generally transverse to the central axis, a cavity adjacent the first end, a concavity adjacent the second end, and a web generally transverse to the central axis, dividing the cavity from the concavity, wherein
the outside surface is spaced from an inside surface of the housing producing a void between the outside surface of the elastomeric insert and the inside surface of the housing so that walls of the elastomeric insert, at the cavity, deflect in response to increases of pressure within the cavity,
the web includes at least one passage extending between and connecting the cavity to the concavity and restricting flow of liquid from the cavity into the concavity, and
the concavity and the housing, at the concavity, define a generally spheroidal volume that is in fluid communication with the outlet port.

16. The beverage maker of claim 15, wherein
each of the first and second ends has a transverse face abutting the inside surface of the housing, and a circumferential face abutting the inside surface of the housing and adjacent the transverse face,
the transverse faces and the circumferential faces of each end are annular,
the transverse faces and the circumferential faces prevent axial movement of the elastomeric insert and radial movement of the elastomeric insert at the first and second ends, relative to the housing, and
the transverse faces and the circumferential faces seal the inlet port and the outlet port from the void between the outer surface of the elastomeric insert and the inner surface of the housing.

* * * * *